United States Patent [19]

Babb

[11] 4,183,464

[45] Jan. 15, 1980

[54] HASH-CODING DATA STORAGE APPARATUS WITH ERROR SUPPRESSION

[75] Inventor: Edward Babb, Old Stevenage, England

[73] Assignee: International Computers Limited, London, England

[21] Appl. No.: 906,054

[22] Filed: May 15, 1978

[30] Foreign Application Priority Data

May 25, 1977 [GB] United Kingdom ............... 21973/77

[51] Int. Cl.² .................... G06F 11/00; G11C 29/00
[52] U.S. Cl. .................................................. 235/312
[58] Field of Search ............................ 235/312, 302.3; 365/200, 201

[56] References Cited

U.S. PATENT DOCUMENTS

| 4,032,765 | 6/1977 | Epstein et al. ...................... 235/312 |
| 4,045,779 | 8/1977 | Markle ............................... 235/312 X |
| 4,047,163 | 9/1977 | Choate et al. .................... 235/312 X |
| 4,066,880 | 1/1978 | Salley ............................... 235/302.3 |

*Primary Examiner*—David H. Malzahn
*Attorney, Agent, or Firm*—Hane, Roberts, Spiecens & Cohen

[57] ABSTRACT

Hash-coding storage arrangements are known which are capable of storing data values efficiently and permitting rapid testing of whether a given data value is stored. However, such arrangements may produce erroneous outputs. The invention reduces or eliminates these erroneous outputs by providing a further store (which may itself be a hash-coding storage arrangement) which identifies the erroneous outputs, and is used to suppress them.

5 Claims, 2 Drawing Figures

HASH-CODING DATA STORAGE APPARATUS WITH ERROR SUPPRESSION

BACKGROUND OF THE INVENTION

This invention relates to data storage apparatus. In data processing, it is often necessary to store a set of data values and then, at some later point of time, to test whether a given value is a member of the stored set of values. The simplest method of doing this is to store the data values in a random-access memory. However, this has the disadvantage that the whole memory must be searched to find out whether a given data value is stored in it. This can obviously be very time-consuming. Alternatively, the data values could be stored in a contents-addressable memory, allowing all the stored data values to be compared very rapidly with the given data value. However, contents-addressable memories are very expensive compared with normal random-access memories.

Another method of storing data values is the hash-coding technique described, for example, in an article by Burton H. Bloom in Communications of the ACM, Vol. 13, No. 7, July 1970 pages 422–426. In particular, in "Method 2" described on page 423 of this article, each data value is hash-coded in a plurality of different ways to produce a plurality of different bit addresses. These addresses are used in turn to address a hash area, containing a number of individually addressable bits, and each bit so addressed is set to "1". To test whether a given data value has been stored, this value is hash-coded in the same way, and the hash area is addressed as before.

If all the addressed bits are equal to "1", then it is assumed that the given data value is stored. Our British patent specification No. 1491706 describes another such hash-coding storage arrangement in which, instead of a single hash area, a plurality of separate areas are used.

Such hash-coding storage arrangements can give a faster response time than a simple random-access memory, without being as expensive as a contents-addressable memory. However, one property of a storage arrangement of this type is that it may produce a number of spurious outputs; that is to say, the output may occasionally indicate that a given data value has been stored when, in fact, it has not. As explained in the above-referenced article, in some applications such spruious outputs may not be objectionable, provided they are not too frequent, and any inconvenience caused by them is outweighed by the saving in cost and/or response time.

Nevertheless, it may still be desirable to reduce the number of spurious outputs, and one object of the present invention is to provide a way of doing this.

SUMMARY OF THE INVENTION

According to the invention, there is provided a data storage apparatus comprising.
(a) a hash-coding storage arrangement of a type which provides spurious outputs;
(b) means for checking the output of the storage arrangement to detect the spurious outputs;
(c) a further store for storing signals identifying the detected spurious outputs; and
(d) means for utilising the contents of the further store to suppress the spurious outputs from the hash-coding storage arrangement.

Preferably, the further store may also be a hash-coding storage arrangement.

BRIEF DESCRIPTION OF THE DRAWINGS

One data storage apparatus and method in accordance with the invention will now be described by way of example with reference to the accompanying drawings of which.

DESCRIPTION OF THE PREFERRED EMBODIMENT

Figure 1:
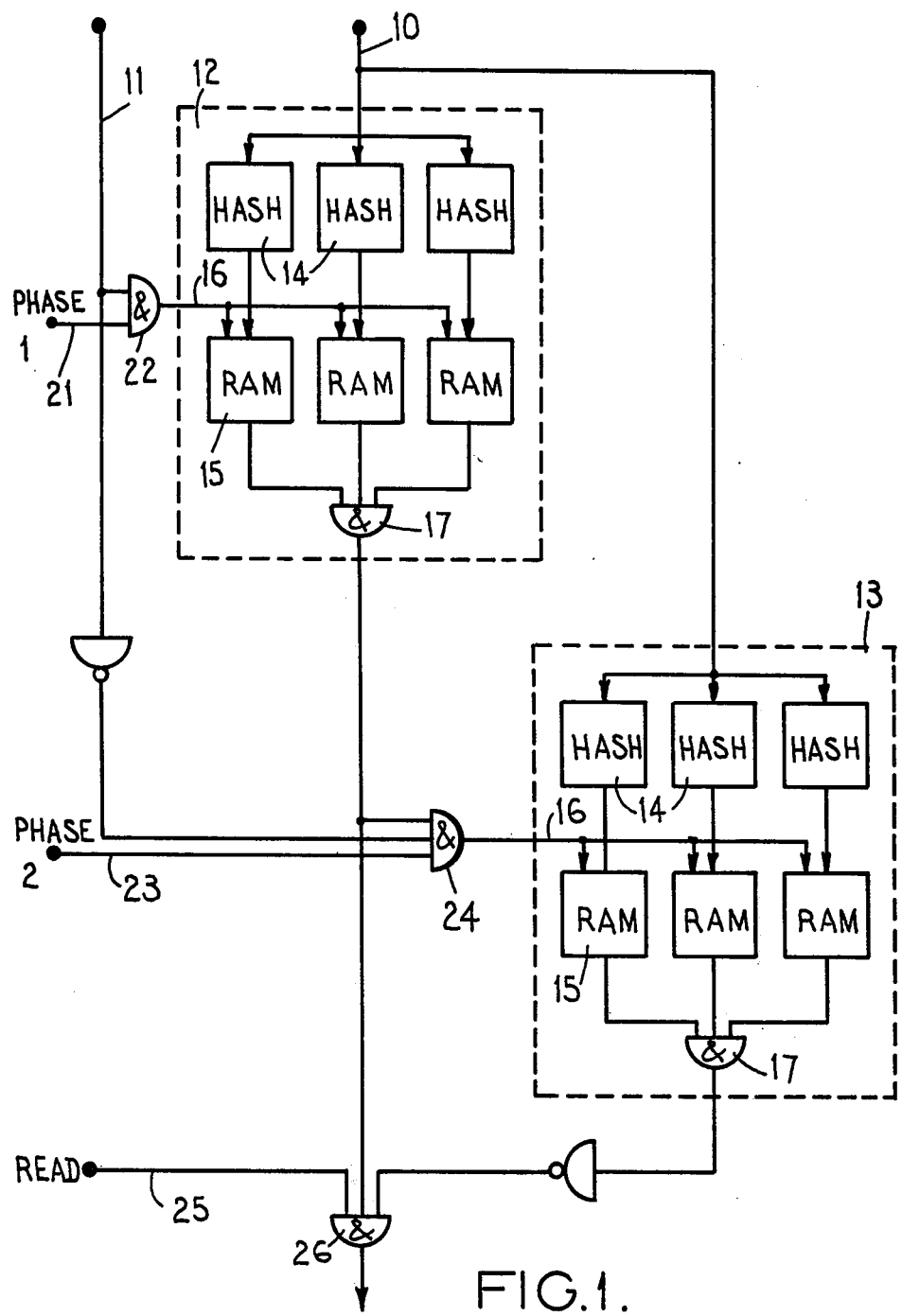
FIG. 1 is a block circuit diagram of the apparatus.

Referring to FIG. 1, the apparatus is arranged to receive a sequence of 24-bit data values over an input data path 10 and to store selected ones of those values. The selected values are indicated by applying a "select" signal to a control input line 11.

The apparatus comprises first and second hash-coding storage arrangements 12 and 13. The storage arrangement 12 contains three hashing circuits 14, which hash-code the input data value in three different ways to produce three 12-bit hash addresses. These hash addresses are applied to the address inputs of three random-access memories 15, each of which contains 4096 individually addressable bit locations. A binary "1" can be written into the addressed bit location of each memory 15 by applying a "1" to a control line 16 which is connected to the write enable inputs of all three memories 15. This causes the memories to store a pattern of bits representing the input data value. The outputs of the three memories 15 are fed to an AND gate 17 which produces a "1" output whenever the addressed bit location in each memory contains a "1". The output of the AND gate 17 provides an indication that the data value which is currently applied to the input data path 10 is one of the previously selected values. Of course, as mentioned previously, some of the output signals from the AND gate 17 will be spurious.

Figure 2:
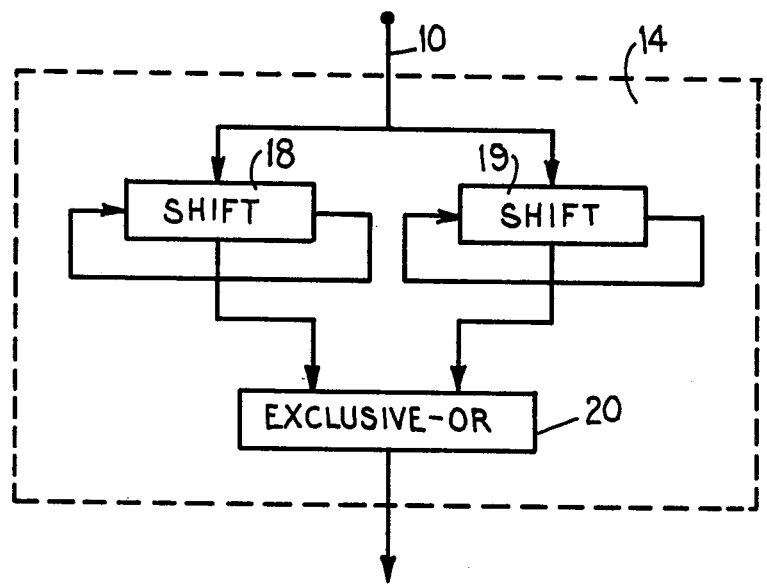
FIG. 2 shows one of the hashing circuits of FIG. 1 in greater detail.

Referring now to FIG. 2, this shows one of the hashing circuits 14 in greater detail. The input data value is applied to two cyclic shift registers 18, 19, each of which is arranged to shift the value to the right by a predetermined number of binary places. (Bits which are shifted out of the right-hand end of the register are fed back to the left-hand end). The least significant twelve bits of each shift register are then applied to an exclusive-OR gate 20 which forms the exclusive-OR of each corresponding pair of bits from the two shift registers, to produce a 12-bit output, which constitutes the hash address output of the hashing circuit. The three hashing circuits 14 are all identical in structure, except that the shifts produced in the shift registers 18, 19 are different for each circuit, such that the three hash addresses are virtually statistically independent of each other. For example, in the three hashing circuits, the shift registers 18, 19 may shift the data value by 12 and 18, 2 and 16, and 8 and 20 binary places respectively.

Returning to FIG. 1, the second hash coding storage arrangement 13 is similar to the first, except that the random-access memories 15 in this second arrangement contain only 1024 bits each, and the hash addresses produced by the hashing circuits 14 are therefore only 10 bits in length. The reason for this is that, as will be seen, the second arrangement is only required to store the data values which produce spurious outputs in the first arrangement, and hence does not need such a large information capacity.

The shifts produced by the shift registers 18, 19 in the hashing circuits 14 of the second arrangement 13 are chosen to be different in each hashing circuit 14 and to be different from those in the hashing circuits of the first arrangement 12. For example, in the three hashing circuits of the second arrangement 13, the shifts may be 0 and 6, 10 and 20, and 4 and 22 binary places respectively.

WRITING

The way in which information is written into the apparatus will now be described. This takes place in two phases. (It is assumed that the contents of all the random-access memories 15 are initially set to zero). In the first phase, a sequence of data values is applied to the input data path 10, and for selected data values a binary "1" is applied to the control line 11. During this first phase, a control line 21 is enabled, so that each time a "1" occurs on line 11 an AND gate 22 is enabled, and a "1" is applied to the control line 16 of the first storage arrangement 12, thus causing the selected data value to be remembered.

During the second phase, the sequence of data values is applied to the input data path 10 for a second time, and once again, whenever one of the selected data values occurs, a binary "1" is applied to the control line 11. This time, the control line 21 is disabled and instead another control line 23 is enabled. The control line 23 is connected to one input of an AND gate 24, the other inputs of which receive the output of the first storage arrangement 12 and the inverse of the signal on the control line 11. The AND gate 24 is therefore enabled whenever (a) an output signal is produced by the first storage arrangement 12 and at the same time (b) no signal is present on the control line 11.

In other words, the AND gate 24 is enabled whenever the output of the first storage arrangement 12 is spurious. The output of the AND gate 24 is applied to the control line 16 of the second storage arrangement 13, and therefore causes the arrangement 13 to remember the data value on the data path 10. Thus, the second storage arrangement remembers those data values which were erroneously remembered by the first storage arrangement during the first phase.

READING

After information has been written into the apparatus as described above, the apparatus may be used to test whether any given data value was one of the selected values. The data value which is to be tested is applied to the input data path 10, and another control line 25 is enabled (the control lines 21, 23 being disabled). The control line 25 is connected to one input of an AND gate 26, the other inputs of which receive the output of the first storage arrangement 12 and the inverse of the output of the second storage arrangement 13.

It can therefore be seen that the gate 26 is enabled only if (a) the first storage arrangement 12 indicates that the data value was one of the selected data values and (b) the second storage arrangement 13 does not produce an error indication. Thus, it can be seen that the second storage arrangement 13 suppresses the spurious outputs from the first storage arrangement 12.

SOME POSSIBLE MODIFICATIONS

It will be appreciated that the second storage arrangement 13 may itself produce some spurious outputs and may therefore indicate that some outputs of the first storage arrangement 12 are spurious when, in fact, they are not; i.e. it may suppress a perfectly valid output. The number of such cases will, in general, be extremely small and may be acceptable in certain applications. Where it is not acceptable, a third hash-coding storage arrangement may be used to remember the spurious outputs from the second storage arrangement, and to suppress these outputs; a third input phase would then be required to write information into this third storage arrangement.

Alternatively, by including an inverter in the control line 11, the first storage arrangement 12 could be made to remember the non-selected data values instead of the selected ones, the second storage arrangement being used, as before to remember the spurious output from the first store. In this case, the output of the gate 26 would also be inverted. The net result is basically the same as before. However, in this modification any spurious output from the second storage arrangement 13 would have the effect of producing a spurious output from the AND gate 26, rather than suppressing a valid output. This might be preferable, depending on the particular application.

In other modifications, different numbers of random-access memories might be used in the hash-coding storage arrangements, i.e. instead of three, each arrangement might include one, two, or more than three memories. (Where only one random-access memory is used, each hash-coding arrangement might be similar to the "Method 2" described in the above-referred article by Burton H. Bloom). Moreover, the way in which the hash addresses are formed could be varied: examples of other methods of forming a hash address are described, for example, in an article by Robert Morris in Communications of the ACM, Vol. 11 No. 1, January 1978, page 34.

Another possible modification might be to replace the second storage arrangement 13 by a contents-addressable memory. This might be economically feasible if the number of spurious outputs from the first storage arrangement 12 were very small.

I claim:

1. A data storage apparatus comprising:
   (a) a hash-coding storage arrangement of a type which produces spurious output signals;
   (b) checking means connected to the output of said storage arrangement for detecting said spurious output signals;
   (c) a further store, connected to the output of said checking means, for storing signals identifying the detected spurious output signals; and
   (d) gating means connected to the output of the storage arrangement and to the output of the further store, for suppressing transmission of output signals from the storage arrangement which are identified by the further store as being spurious.

2. A data storage apparatus comprising:
   (a) a hash-coding storage arrangement for storing representations of selected members of a sequence of data values and then, in response to a given data value, producing an output signal indicating whether or not a representation of that given value has been stored, the arrangement being such that some of said output signals may be spurious;

(b) checking means connected to the output of said storage arrangement for detecting said spurious output signals;

(c) a further store, connected to the output of said checking means, for storing representations of the data values which produce the detected spurious output signals; and (d) gating means connected to the output of the storage arrangement and to the output of the further store, for suppressing transmission of output signals from the storage arrangement which are identified by the further store as being spurious.

3. Apparatus according to claim 2, wherein said further store also consists of a hash-coding storage arrangement.

4. Apparatus according to claim 2 wherein said hash-coding storage arrangement comprises (a) means for hash-coding an input data value in a plurality of different ways to produce a plurality of hash addresses;

(b) a plurality of random access memories each containing a plurality of individually addressable bit locations, address inputs of the memories being connected to the hash-coding means so as to receive respective ones of said hash address;

(c) means connected to data inputs of said random access memories for writing a predetermined binary value into the addressed bit locations of the memories; and (d) means connected to data outputs of said random-access memories, for producing an output signal whenever the addressed bit locations all contain said predetermined binary value.

5. A method of storing and retrieving information, comprising the steps:

(a) storing the information in a hash-coding storage arrangement of a type which produces spurious outputs;

(b) checking the output of the storage arrangement to detect the spurious outputs;

(c) storing signals in a further store, identifying the spurious outputs; and (d) retrieving information from the hash-coding storage arrangement, using the output of the further store to suppress transmission of the spurious outputs.

* * * * *